United States Patent Office 3,553,724
Patented Jan. 5, 1971

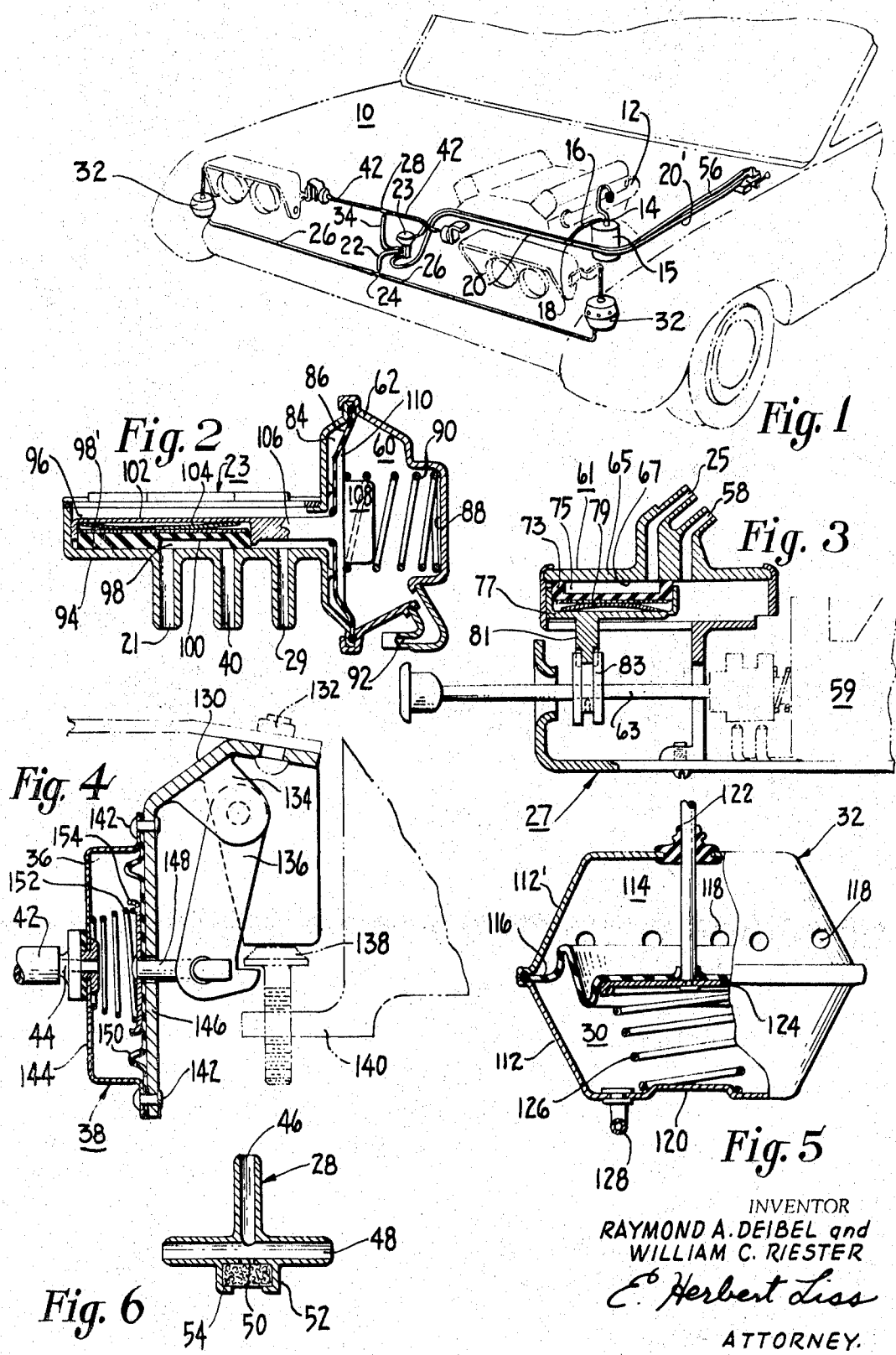

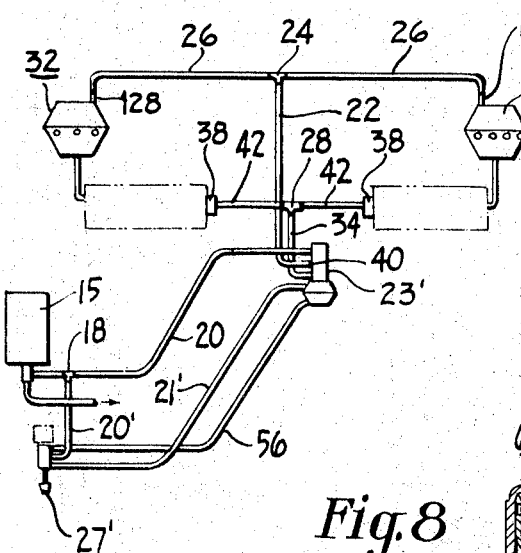
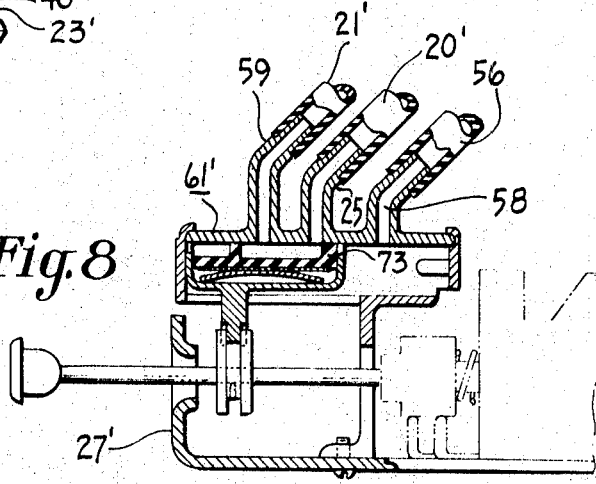
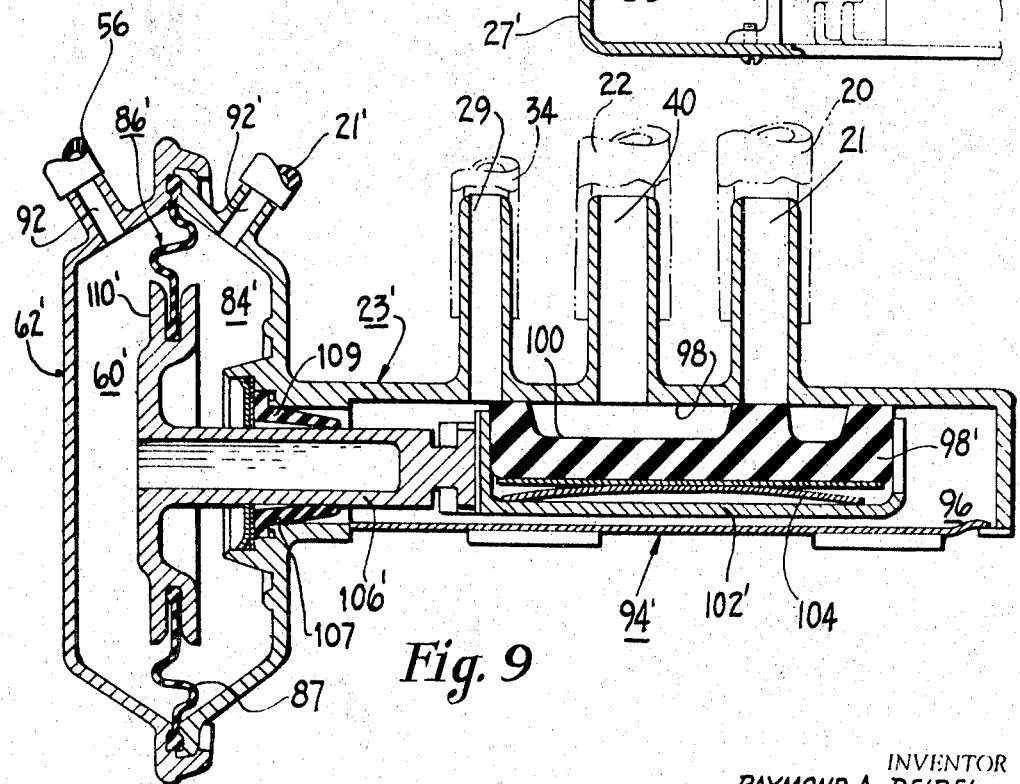

3,553,724
PNEUMATIC ACTUATOR FOR RETRACTABLE HEADLAMP SYSTEM
Raymond A. Deibel, Cheektowaga, and William C. Riester, Williamsville, N.Y., assignors to Trico Products Corporation, Buffalo, N.Y.
Original application June 18, 1968, Ser. No. 739,914, now Patent No. 3,439,580, dated Apr. 22, 1969. Divided and this application Nov. 15, 1968, Ser. No. 795,760
The portion of the term of the patent subsequent to Sept. 17, 1985, has been disclaimed
Int. Cl. B60q 1/06
U.S. Cl. 240—61.1                                     3 Claims

ABSTRACT OF THE DISCLOSURE

A fluid pressure system utilizing vacuum pressure to actuate retractable headlamps in a motor vehicle which includes a single acting fluid pressure differential operated power unit for moving the headlamps to and from their operative position. A pressure differential operated servo-valve cotrols the application of fluid pressure from a source to the power unit as well as from the power unit to a fluid pressure differential operated latching mechanism. The latching mechanism diaphragm chamber is placed in communication with the power unit for unlatching a restricted bleed in the line connecting the power unit and the latch vents the system to permit return of the diaphragms in both the latch unit and the power unit. A manually operated controller selectively ports vacuum to the servo-valve and also serves as a switch for the headlamp electrical circuit.

---

This is a division of application Ser. No. 739,914, filed June 18, 1968 and now Pat. No. 3,439,580 issued Apr. 22, 1969 which is a continuation of application Ser. No. 566,520 filed July 20, 1966 and now abandoned.

The present invention relates to a control system for operating movable auxiliary equipment in motor vehicles and, more particularly, to a control system for actuating engine powered retractable headlamps or headlight shields.

For better vision through roadway illumination and safe operation of a motor vehicle at night, it is essential that the headlamp lenses be maintained in a clean condition to avoid dim lights and undesirable refraction of the light from the headlamps. Retractable headlights have been provided to avoid insect impingement, wheel-spray and road dirt and dust accumulation, sleet coating and snow impact when they are not in use. There have also been provided headlamp shields which retract when the headlamps are turned on. Although shielding the headlights from the wheel-spray and other accumulation of dirt on the lenses thereof is an important safety feature, it is essential when such safety feature is provided that the shielded headlamps be fully powered to be movable into operative position overcoming freeze down in low temperatures, rapidly and without fail so that the shields be retracted immediately when the headlights are switched on.

Another advantageous and desirable aspect of retractable headlights and headlight shields is the aesthetic appearance provided by a smooth uninterrupted front end on a motor vehicle.

A unique rapidly acting, fail-safe system has been provided by the present invention which utilizes engine power for retracting the shields or while moving the headlamps to operative position simultaneously with turning on of the headlights. The system incorporates a vacuum actuated power unit for each headlamp wherein a stored high vacuum supply is controlled by a servo-valve remotely disposed with respect to the operator controlled manual actuator, but placed in a position proximate the power units where friction free large size conduit connections can be provided for supplying the maximum high vacuum to the power units. The servo-valve is disposed close to the power units enabling the use of conduit connections to thereby provide rapid action. Only a single control line from the manual control to the servo-valve is required to actuate the servo-valve.

The principal object of the present invention is to utilize top engine power in an improved fail-safe, economical pneumatic system for actuating auxiliary equipment in motor vehicles.

Another object of the invention is to provide a pneumatically energized servo-valve for controlling the power source for a pneumatic system which is provided to actuate retractable headlamps and retractable headlamp shields regardless of weather and temperature conditions.

A further object of the invention is to provide a pneumatic system for actuating auxiliary equipment in a motor vehicle which incorporates a novel pneumatic latch mechanism for retaining the auxiliary equipment in operative position, which latch mechanism utilizes vacuum stored in the system and which assures unlatching prior to movement of the auxiliary equipment.

Other objects and advantages of the invention will be apparent from the following detailed description taken in connection with the accompanying drawings in which:

FIG. 1 is a schematic view of the invention embodied in a motor vehicle;

FIG. 2 is a cross sectional view of the servo-valve utilized in this invention;

FIG. 3 is a cross sectional view of the manual control utilized in this invention;

FIG. 4 is a sectional view of the headlight latch element;

FIG. 5 is a view partly in section of the power unit utilized in the invention;

FIG. 6 is a sectional view of the venting T utilized in the modification of the invention shown in FIG. 1;

FIG. 7 is a schematic diagram of a modified embodiment of the invention; FIG. 8 is an assembly of a manual control for use with the embodiment of FIG. 7; and FIG. 9 is a longitudinal cross section view of a modified servo-valve utilized in the embodiment of FIG. 7.

Briefly, the invention comprises a control system illustrated by way of example for use with a pair of retractable headlight sets, each of which is connected by suitable linkage with the diaphragm of a fluid pressure operated power unit or actuator. It will of course be understood that in accordance with its broader aspects, the invention may be utilized for actuating other and different auxiliary equipment. A pneumatically operated servo-valve selectively ports a vacuum to create a fluid pressure differential across the diaphragm of the power unit in one direction. The diaphragm of the power unit is spring biased to the opposite position and latched by a pneumatically operated latch. To disengage the latch for moving the headlamps to a retracted position the vacuum in the power unit chamber is placed in communication with the chamber of the latch actuator. This vacuum circuit is slowly vented through a bleeding T connection, thereby providing smooth action for moving the headlights to retracted position and assuring an initial unlatching operation before movement of the headlamps begins.

The present invention is similar in some respects to the invention of application Ser. No. 566,521 by Raymond A. Deibel and William C. Reister, filed concurrently herewith and now Pat. No. 3,402,288, issued Sept. 17, 1968, and assigned to the assignee of the present invention. However, this control system is designed for total pneumatic operation.

In FIG. 1 the system is shown embodied in a motor vehicle 10 having a manifold 12 serving as a vacuum source. The manifold 12 is connected through a check valve 14 to a vacuum storage tank 15 in such a manner as to apply vacuum directly to the control system from the manifold 12 when the manifold vacuum exceeds the vacuum pressure in the storage tank 15 and vice versa. The supply line 16 from the vacuum source 15 is connected through a T 18 and a conduit 20 to the source port 21 of the servo-valve 23. The supply line 16 is also connected through T 18 and a conduit 20' to the inlet port 25 of the manual control 27. A conduit 22 connects the central port 40 of servo-valve 23 through a T 24 and a pair of conduits 26 to the lower chamber 30 of each of the headlamp actuators or power units 32. A conduit 34 connects the chamber 36 of the latch actuator assembly 38 to the port 29 of the servo-valve 23 through a bleeding T 28 and a pair of conduits 42 through port 44 of the latch actuator assembly 38. The bleeding T 28 is illustrated in FIG. 6 and comprises an outlet nipple 46 and inlet conduits 48. The T 28 has a bleed opening 50 with a retainer flange 52 for securing filter material 54 as, for example, felt. A conduit 56 connects the port 58 of the manual control with the compartment 60 in the diagram chamber 62 of the servo-valve 23.

The manual control 27 may be mounted on the dash panel or in any other suitable or convenient place for operation by the driver of the vehicle. The manual control includes an electric switch section 59 for operating the headlight energizing circuit and the fluid pressure section 61 for operating the retractable headlamps. As illustrated in FIG. 1, the headlamps are retractable, together with the shield, as a unit. It will, of course, be understood that separate retractable shields may be provided and also that other and different auxiliary equipment may be actuated by this system in accordance with the broader aspects of the invention. When the headlamps are in retracted position, the shield is down and forms a part of the frontal design of the car and when the headlamps are in operating position, the shield is in retracted position. A single actuating shaft 63 may be provided for operating the headlight circuit and the fluid pressure control system simultaneously. The manual actuating shaft 63 may be rotatable and axially movable. Since the headlight circuit section 59 of the manual control forms no part of the present invention, there will be no further description except insofar as it should be apparent that axial movement of the shaft 63 operates the lighting circuit simultaneously with the fluid pressure control system for the retractable headlamps. The fluid pressure section 61 of the manual control 27 includes a housing 65 having a valve seat 67 provided with a port 25 and a port 58. A valve 73 is slidable on the valve seat 67 and includes a recess 75 facing the valve seat 67. The slide valve 73 is received in a valve retainer 77 and is maintained in contact with the valve seat 67 by leaf spring 79. The retainer 77 has a lug 81 extending therefrom which is operatively engageable with a peripherally recessed disc member 83 rigidly mounted on the manual actuating shaft 63 to cause the retainer 77 and the slide valve 73 to move with axial movement of the actuating shaft 63. In the inwardmost position of the actuating shaft 63, the ports 25 and 58 are in communication through recess 75 and in the outermost position of the actuating shaft 63, communication between ports 25 and 58 is blocked.

A servo-valve 23 is shown in FIG. 2 which includes a diaphragm chamber 62 separated into compartments 60 and 84 by a diaphragm 86. The diaphragm chamber 62 includes a recess 88 serving as a spring retainer. A spring 90 is seated at one end in the recess 88. The housing of the diaphragm chamber 62 has a port 92 communicating with compartment 60. The servo-valve 23 also includes a slide valve section 94 which encloses a chamber 96. The housing is provided with a valve seat 98 upon which a slide valve 98' is seated. The slide valve 98' includes a recess 100 on its face adjacent the valve seat 98 and is dimensioned to effect communication in one position between the port 21 and a port 40 and in another position to effect communication between port 40 and port 29. The ports 21, 40 and 29 are provided in the valve seat 98. The valve 98' is so dimensioned as to block port 21 when port 40 and port 29 are connected, but to open port 29 when port 40 and port 29 are connected. The valve 98' is received in a valve retainer 102 and is retained against its seat by a spring 104. The valve retainer 102 includes a stem 106 having a flange 110 and a headed portion 108 within the compartment 60. The flange 110 is in engagement with the diaphragm 86 and the head 108 forms a spring retainer for the other end of the spring 90. The diaphragm and valve, therefore, are biased to the left as seen in FIG. 2 by spring 90 so that ports 21 and 40' are in communication in the normal or unactivated position of the servo-valve.

A power unit 32 (FIG. 5) is provided. It includes a housing comprising a pair of housing halves 112 and 112' crimped together, separated into compartments 30 and 114 by a diaphragm 116. Although the housing halves 112, 112' of the housing are shown and described as being crimped together, it should, of course, be understood that any suitable means of securing the housing halves together in air-tight relation may be utilized as, for example, welding or brazing. The periphery of the diaphragm 116 is secured at the junction between the housing halves.

The housing half forming the compartment 114 is perforated as at 118 to permit communication with the atmosphere. A convex embossment 120 is provided on the housing half 112 forming the compartment 30, which embossment constitutes a spring retainer. A link or stem 122 is provided and is secured to a cup 124 lying in juxtaposition with the diaphragm 116 on the side of the diaphragm enclosing the compartment 30. The cup 124 forms a spring retainer for the other end of a spring 126 which is seated at one end on spring retainer 120. The spring 126 biases the diaphragm 116 toward compartment 114, together with the link or rod 122. A port 128 is formed in the housing which communicates with compartment 30 of power unit 32.

A latch assembly 38 is provided to maintain the headlamps in operative position and is vacuum operated in a unique manner to be hereinafter described. The latch assembly includes a bracket 130 secured to a rigid portion of the car adjacent each headlamp in any suitable manner as, for example, by a bolt and nut assembly 132 as shown. The bracket includes an ear 134 on which a pawl 136 is pivotally mounted. The pawl 136 at its free end engages a headed stud 138 mounted on an ear 140 of the headlamp shield. Secured to the bracket as by rivets 142, or in any other suitable manner, is an actuator assembly 144 for moving the pawl 136 about its pivotal connection with the ear 134. The pawl actuator assembly 144 includes a cup-shaped housing closed on its open side by a wall 146 of bracket 130. A push rod 148 is operatively engaged with the pawl 136 at one end and with a diaphragm 150 within the housing 144 at its other end. The periphery of the diaphragm 150 is retained between a flange of the cup-shaped housing 144 and the wall 146 of bracket 130 and is clamped in this position by the rivets 142. A port 44 is provided on the closed side of the cup-shaped housing 144 and a spring 152 extends between the diaphragm 150 and the housing 144. It is retained in position centrally on the diaphragm by a cup 154 which lies adjacent to the diaphragm and which is secured to the push rod 148. The diaphragm 150 is then spring biased inwardly and in turn biases the pawl 136 into engagement with the headed stud 138. The headed stud 138 is adjustably mounted by threaded means to the lug 140 on the retractable headlamp shield.

The system is in the headlight on position with the headlights in the operable position as illustrated in the drawings. With the manual control operating stem 63 pulled outwardly, as shown in FIG. 3, the headlight contacts are closed and the valve 73 is drawn to such a position that communication between ports 25 and 58 is closed. Thus, vacuum from the source through conduit 20' to diaphragm chamber 60 is blocked at the manual control 27, thereby preventing actuation of the diaphragm 86. The diaphragm 86 is thus biased to the left as viewed in FIG. 2 by the spring 90, thereby biasing the valve 98' to a position connecting ports 21 and 40. Thus vacuum is impressed upon the chamber 30 through conduit 20, port 21, recess 100, port 40, conduit 22, T 24 and conduits 26 through port 128. This draws the diaphragm 116 and consequently the rod 122 downwardly against the bias of the spring 126, causing the headlamps to move to the operative position with the pawl 136 engaging the bolt-head 138 to latch the headlamps in operative position.

Depressing the stem 63 opens the lighting circuit thereby turning off the headlights. This also effects communication between ports 25 and 58 of the manual control 27. Vacuum is now impressed upon the chamber 60 of servo-valve 23 through conduit 20', port 25, port 58, conduit 56 and port 92. This causes the diaphragm 86 to retract against the bias of the spring 90 and, by means of stem 106, draws valve 98' to a position to the right as seen in FIG. 2. In this position the port 21 is closed. Ports 40 and 29 are then in communication. Thus, vacuum is impressed upon the diaphragm 150 in the latch actuator assembly 144 since the chamber 30 is in communication with the diaphragm chamber of the latch actuator assembly 144. This communication occurs through port 128, conduits 26, T 24, conduit 22, port 40, port 29, conduit 34, bleeding T 28, conduits 42 and port 44. The vacuum impressed upon the diaphragm 150 of the latch actuator assembly 144 causes the diaphragm 150 to be drawn against the bias of the spring 152, thereby moving the pawl 136 to a released position, disengaging it from the bolt-head 138. The system, including the chamber 30 of the headlamp actuator or power unit 32, is vented slowly through the bleeding T 28, permitting the spring 126 to drive the diaphragm 116 and consequently the rod 122 upward as viewed in FIG. 5, thereby retracting the headlamps. The slow bleed in the bleeding T 28 causes a slow, controlled movement of the headlamps and avoids banging. It also assures that the pawl 136 will be unlatched prior to movement of the headlamps.

When it is desired to again turn the headlamps on and turn them to operative position, the stem 63 of the manual actuator 27 is pulled to engage the contacts thereby turning on the headlights and, at the same time, moves the valve 73 to a position interrupting communication between ports 25 and 58. Port 58 is vented to atmosphere, thereby venting chamber 60 through port 92, conduit 56 and port 58.

Another modification of the invention is illustrated in FIGS. 7, 8, and 9 wherein a double acting servo-valve 23' is utilized. This double acting servo unit 23' is activated pneumatically in both directions. The servo-valve 23', best shown in FIG. 9, includes a diaphragm chamber 62' separated into compartments 60' and 84' by a diaphragm assembly 86'. The diaphragm 86' includes a flexible diaphragm 87 of any suitable elastomeric material. It is secured at its periphery between a pair of substantially cup-shaped members forming a housing to enclose diaphragm chamber 62'. The diaphragm is centrally apertured and its inner periphery engages a peripheral recess on the edge of a rigid plate member 110'. The plate member 110' has rigid secured thereto or integral therewith a central stem 106'. Stem 106' extends through compartment 84' and through central opening 107 in the end wall of the cup-shaped housing member enclosing compartment 84'. A gland seal 109 is provided in the central opening 107 to provide a sliding seal for stem 106'. The stem 106' extends into a slide valve section 94' and is rigidly secured to the valve retainer 102'. Slide valve section 94' of servo-valve 23' is identical in every respect including its function to the slide valve section 94 illustrated in FIG. 2 and includes ports 21, 29, and 40 extending into valve seat 98 within chamber 96. Valve 98' is slideable on valve seat 98 and includes recess 100. The valve 98' is received in a valve retainer 102' and is retained against its seat 98 by a spring 104. The diaphragm chamber 62' has a port 92 communicating with compartment 62' and a port 92' communicating with compartment 84'.

The manual control 27' in FIG. 8 is substantially the same as the manual control in FIG. 3 except that the fluid pressure section 61' includes in addition to ports 25 and 58, an additional port 59. The valve 73 is slideable between an "off" position where it effects communication between ports 25 and port 58 where it vents port 59, and an "on" position wherein it connects port 25 and port 59, while venting port 58.

The system is connected as shown in FIG. 7 between the servo-valve 23' and the headlamps is identical to that shown in FIG. 1. Compartments 30 of the power units 32 are connected to port 40 of servo-valve 23' through conduit 22, T 24, conduits 26, and ports 128. Chambers 36 of the latch actuator assemblies 38 are connected through conduits 42, venting T 28 and conduit 34 to port 29 of the servo-valve 23'. The fluid pressure source which is illustrated is a vacuum source is connected to the port 21 of the servo-valve 23' through T 18 and conduit 20. The source 15 is also connected through T 18 and conduit 20' to source port 25 of manual control 27'. The compartment 60' of servo-valve 23' is connected to port 58 of the manual control 27' through conduit 56. The chamber 84' of the servo-valve 23' communicates through port 92' and conduit 21 with port 59 of the manual control 27'.

The operation of the embodiment shown in FIGS. 7, 8, and 9 should now be apparent. When the manual control 27' is placed in the "on" position shown in FIG. 8, the ports 25 and 29 are placed in communication through valve 73. Thus, vacuum from the source 15 is applied to the compartment 84' of servo-valve 23' through conduit 20', port 25, valve 73, port 59, conduit 21, and port 92'. The pressure being negative, draws the diaphragm 86' to the right from the position seen in FIG. 9 thereby effecting communications between ports 40 and 21 of servo-valve 23'. Thus chambers 30 of power units 32 are connected to the source 15 through ports 128, conduits 26, T 24, conduit 22, port 40 of servo-valve 23', valve 98', port 21, conduit 20 and T 18. Thus the vacuum is applied against the bias of spring 126 to move the diaphragm 116 of headlamp actuator 32 downward from the position seen in FIG. 5 to place the headlamps in operative or open position. The pawl 136 engages the bolthead 138 to latch the headlamps in operative position.

When the manual control is pushed from the position shown in FIG. 8 to the right or "off" position, ports 25 and 58 are connected through valve 73 and port 21' is opened to atmosphere through the body of manual control 27'. Chamber 84' is thus vented through port 92', conduit 21' and port 59 through the body of manual control 27'. Vacuum is applied to the chamber 60' of servo-valve 23' from source 15, conduit 20', port 25, through valve 73, port 58, conduit 56 and port 92, thus drawing the diaphragm 86' to the left as viewed in FIG. 9, causing the valve 98' to close port 21 of servo-valve 23' and connect ports 29 and 40. The chamber 30 is now in communication with chamber 36 of latch actuator assembly 38 through ports 128, conduits 26, conduit 22, port 40, valve 98', port 29, conduit 34 and matured bleeding T 28 through conduits 42. Thus vacuum which had been stored in the compartments 30 of the power units 32 is applied to the latch actuator assembly 38 and slowly vented through the venting T 28. Thus the latch is tripped prior to the venting of the system. Then the springs 126 of the power units 32 move the diaphragms 116 together with the operating rods 122 upwardly, as viewed in FIG. 5, to move the headlamps to retracted position. The vacuum which had been stored in compartments 30 of the power units is applied slowly, eliminating noisy operation when moving to the retracted position.

A fail-safe pneumatically controlled system for operating auxiliary equipment in motor vehicles has been shown and described embodied in a retractable headlight system. Although the system has been shown and described for use with a retractable headlight system, it will, of course, be understood that such a system can be employed to power other and different units. In the event of failure of any part of the system, the headlights will be retained and latched in operative position. This is true whether the failure be due to loss of vacuum or from any cause. A servo-valve is employed which can be remotely operated by the manual actuator and may be disposed adjacent the equipment to be operated so as to permit rapid operation.

Although certain specific embodiments of the invention have ben shown and described for the purpose of illustration, it will be apparent that in its broader aspects, various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. In a motor vehicle having a plurality of headlamp assemblies spaced apart, each assembly including a pivotally mounted retractable element for movement from a closed position wherein the headlamps are covered to an operative position wherein the headlamps are exposed; a vacuum operated control system comprising a fluid pressure differential actuated power unit operatively connected to said pivotally mounted element for driving said element between its closed and operative positions, a fluid pressure operated servo-valve having a porting section and a housing enclosing a pair of expansible chambers separated by a movable wall, said porting section including intake, outlet and venting ports, valve means operatively connected to said movable wall element for selectively effecting communication between said inlet port and said outlet port, and between said vent port and said outlet port, means for connecting said inlet port to a vacuum source, means for connecting said outlet port to said power unit and control means for applying vacuum pressure to one side of said movable wall while venting to atmosphere the expansible chamber on the opposite side of said movable wall through said porting section of said servo-valve whereby actuation of said control valve means energizes said power unit through said servo-valve to cause said headlamp assembly element to move from its closed position to its operative position or vice versa.

2. The combination of claim 1 wherein said control means comprises manually actuated control valve means for controlling communication between one of said expansible chambers and a vacuum source.

3. The combination of claim 2 wherein said manually actuated control valve means includes electrical switching contacts operable simultaneously with actuation of said valve means for controlling electrical energization of said headlamps.

References Cited
UNITED STATES PATENTS

| | | | |
|---|---|---|---|
| 3,171,603 | 3/1965 | Eriksson | 240—62.3X |
| 3,325,636 | 6/1967 | Roberts, Jr. et al. | 240—61.1X |
| 3,402,288 | 9/1968 | Deibel et al. | 240—61.1 |

JOHN M. HORAN, Primary Examiner

R. P. GREINER, Assistant Examiner

U.S. Cl. X.R.

240—7.1, 62.3